United States Patent [19]

Tanaka

[11] Patent Number: 5,297,131
[45] Date of Patent: Mar. 22, 1994

[54] ECCENTRICITY DETECTION AND COMPENSATION OF A DISK BY A PREFORMATTED ENCODING PATTERN

[75] Inventor: Shosuke Tanaka, Kanagawa, Japan
[73] Assignee: Sony Corporation, Tokyo, Japan
[21] Appl. No.: 889,671
[22] Filed: May 28, 1992
[30] Foreign Application Priority Data
May 31, 1991 [JP] Japan .................. 3-129465
[51] Int. Cl.⁵ ............................. G11B 7/007
[52] U.S. Cl. ......................... 369/275.2; 369/44.32; 369/44.26; 369/275.3; 360/77.04
[58] Field of Search ............ 369/32, 98, 44.25, 44.11, 369/47, 275.3, 275.4, 275.2, 44.32, 44.34, 111; 360/77.04

[56] References Cited

U.S. PATENT DOCUMENTS

| | | | |
|---|---|---|---|
| 4,685,096 | 8/1987 | Romeas | 369/44.26 |
| 4,754,339 | 6/1988 | Nagai et al. | 369/32 |
| 4,955,008 | 9/1990 | Collomey et al. | 369/32 |
| 5,042,021 | 8/1991 | Nagano et al. | 369/44.32 |
| 5,121,374 | 6/1992 | Barton et al. | 369/44.29 |
| 5,140,575 | 8/1992 | Fushiki | 369/44.32 |

FOREIGN PATENT DOCUMENTS

| | | |
|---|---|---|
| 0082390A3 | 6/1983 | European Pat. Off. . |
| 0177737A3 | 4/1986 | European Pat. Off. . |
| 3609460A1 | 10/1966 | Fed. Rep. of Germany . |
| 1565829 | 4/1980 | United Kingdom . |

Primary Examiner—Paul M. Dzierzynski
Assistant Examiner—Kim-Kwok Chu
Attorney, Agent, or Firm—Philip M. Shaw, Jr.

[57] ABSTRACT

An area for recording a preformated encoding pattern is provided on a rewritable disk in order to obtain information of an eccentricity produced when the disk is chucked. The information of the eccentricity produced at the time of disk chucking is detected, while the disk is being driven, from a reference pulse obtained by reproduction of the encoding pattern and, on the basis of the eccentricity information, the frequency of the clock for writing data or reading data is modulated according to eccentric positions.

17 Claims, 7 Drawing Sheets

REGION OF ENCODING PATTERN

ECCENTRICITY DETECTION AND COMPENSATION OF A DISK BY A PREFORMATTED ENCODING PATTERN

BACKGROUND OF THE INVENTION

1. Field of the Invention

The present invention relates to a rewritable disk advantageously applicable to a magneto-optic disk of a type allowing additional writing or rewriting and hardware (disk apparatus) for the same.

2. Description of the Related Art

Of magneto-optic disks, rewritable disks on which data can be rewritten many times are known. Such a magneto-optic disk 10 has, as shown in FIG. 10, tracks (concentric tracks) formed thereon along concentric circles with respect to its chucking hole 12, and each track has a plurality of sectors 16 formed in the circular direction at a predetermined pitch, the sectors storing video data, audio data, and other data.

Between the sectors 16, 16, there is provided an edit gap (EG) 18 as shown in FIG. 11. The edit gap 18 is a clearance area which is provided for preventing data to be written in one sector from being written into the adjoining sector even if there exists an eccentricity produced at the time of disk chucking. Usually, the edit gap 18 is designed to have a length W around 1% of the length L of the sector 16 in the circular direction, because most of eccentricities caused by the eccentric chucking can be absorbed by the edit gap 18 arranged to have such length.

An apparatus for the rewritable magneto-optic disk chiefly recording and reproducing image information is connected with various image devices through an interface and video signals output from the devices are digitally recorded and reproduced in the apparatus. Since the signals are video signals, they are transmitted at the rate of 120Mbps to 540Mbps and it is required that the signals are recorded over a period from several minutes to dozens of minutes. Therefore, the magneto-optic disk for the described use is required to allow recording of considerably high density. Hence, a high degree of accuracy in repeated recording is required of the magneto-optic disk also out of necessity for exchangeability.

However, in the case of the magneto-optic disk 10 employing such a format as shown in FIG. 10, the data length of the edit gap 18 is designed to include a sufficient length of clearance, and hence the total length of the edit gaps 18 amounts to a considerable length even if the length W of each gap is around 1% of the length of the sector 16, and this has been a cause preventing achievement of high-density recording.

SUMMARY OF THE INVENTION

The present invention has been made to solve the above problem involved in the prior art and it has as its object the provision of a rewritable disk, in which the length W of the edit gap 18 is made much smaller than in the conventional type to thereby achieve higher-density recording, as well as the provision of an apparatus for such disk.

In order to solve the above mentioned problem, a rewritable disk of the present invention is characterized by an area provided thereon for recording a preformated encoding pattern, from which information of the eccentricity produced at the time of disk chucking is obtained.

When the rewritable disk provided with the area for recording the preformated encoding pattern is driven, the information of the eccentricity produced at the time of the disk chucking is detected from a reference pulse obtained by reproduction of the encoding pattern, and on the basis of the eccentricity information, the frequency of the clock for writing or reading data is modulated according to eccentric positions.

The encoding pattern allowing detection of eccentricity information therefrom is preformated in an encoding pattern area 22 formed on a magneto-optic disk 10 at a predetermined position as shown in FIG. 1. (Refer to FIG. 3.)

At the time of data recording, the encoding pattern is reproduced from the area 22 with a reading means 32 and a reference pulse RP (see FIGS. 4A and 4B) is generated from the encoding pattern. When the disk 10 is chucked with an eccentricity of d produced as shown in FIG. 5, the reading locus of the encoding pattern becomes as indicated by the concentric circle 36, and therefore, the frequency of the reference pulse becomes lower than the regular frequency on the side (A) and becomes higher than the regular frequency on the side (B).

Accordingly, the clock used when data is recorded in the sector 16 set up on the concentric circular track 14 (write clock WCK) is modulated on the basis of eccentricity information obtained from the reference pulse. More specifically, the clock frequency is made lower than the regular frequency on the side (A) and, conversely, made higher than that on the side (B). Then, even if the disk 10 is chucked with an eccentricity produced, prescribed digital data can be written correctly in the sectors 16 at the write area. Reading of the data can also be performed correctly. By so arranging, the area of the edit gap 18 can be narrowed without posing any problem.

DETAILED DESCRIPTION OF THE PREFERRED EMBODIMENTS

Now, an example of a rewritable disk and an apparatus therefor according to the present invention when applied to the above described magneto-optic disk will be described below in detail with reference to the accompanying drawings.

Figure 1:
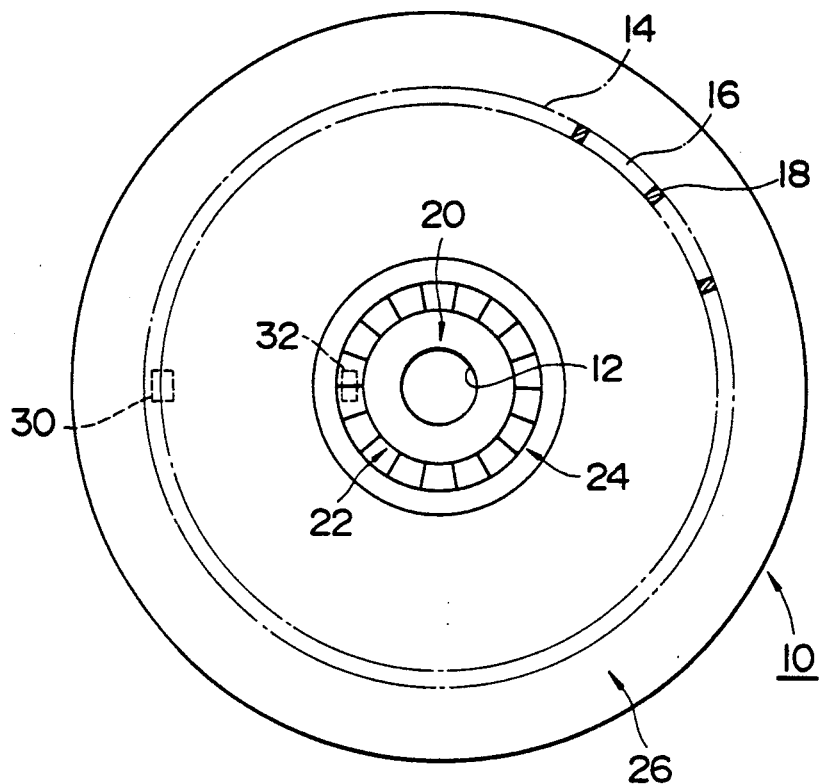
FIG. 1 is a structural drawing showing an example of a rewritable disk according to the present invention.

The present magneto-optic disk is a disk on which data can be rewritten many times. As shown in FIG. 1, the disk 10 is provided with a circular area 20, used as the chucking area, disposed contiguously to the chucking hole 12, and with a concentric circular area 22 for forming an encoding pattern therein disposed at the outer circumferential portion of the area 20, in the present embodiment. In the area 22, there is preformatted a specific pattern in the circular direction as described later.

On the outer side of the encoding pattern area 22, there is provided a concentric circular index area 24. In the index area 24, structural information of the segment pattern corresponding to the kind of the signal to be recorded is written. The structural information includes the sector size, number of sectors/picture, number of bits forming a word, etc. All recording/reproducing operations on the disk 10 after the structural information has been written thereon are performed in accordance with this structural information.

Figure 2:
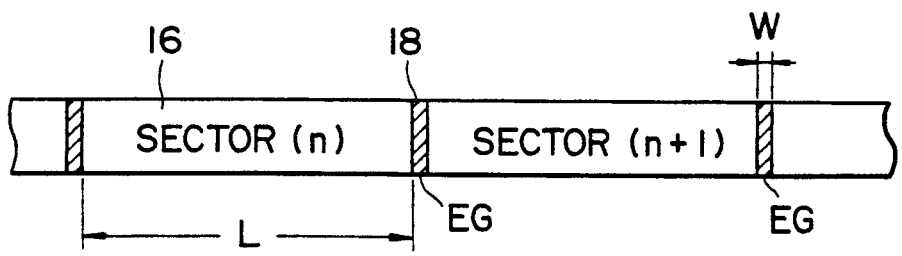
FIG. 2 is a detailed drawing of a portion of a concentric circular track.

The whole area outside the index area 24 is used as a data area 26. Within the data area 26, there are formed concentric tracks, or a spiral track, 14 arranged in the radial direction, or extended to the circumference. The track 14 has a plurality of units successively formed in its circular direction, each unit being formed of a combination of the sector 16 and edit gap 18. When the length of the sector 16 (either of the data length and the physical length) is represented by L, as shown in FIG. 2, the length W of the edit gap 18 corresponds to several clocks of the clock used at the time of recording or reproducing data (the write clock WCK or the read clock RCK). Hence, the edit gap 18 is of a negligible length as compared with the sector 16.

On the disk 10 with the described structure, data are written or read by a recording-reproducing head (optical head) 30 arranged in confrontation with the disk 10. In the present invention, there is further provided an encoding pattern reading means 32 in confrontation with the encoding pattern area 22. As the reading means 32, either of magnetic means and optical means can be used. In the present example, the latter reading means (a reflection type detecting means to be concrete) is employed.

Figure 3A:
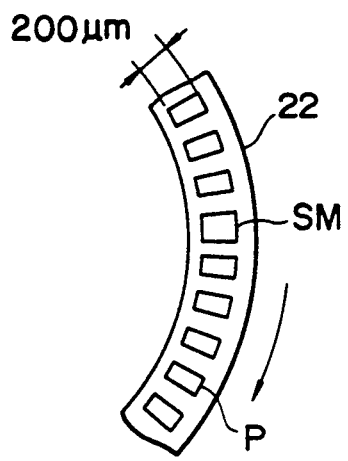
FIGS. 3A and 3B are pattern diagrams showing examples of encoding pattern.
Figure 3B:
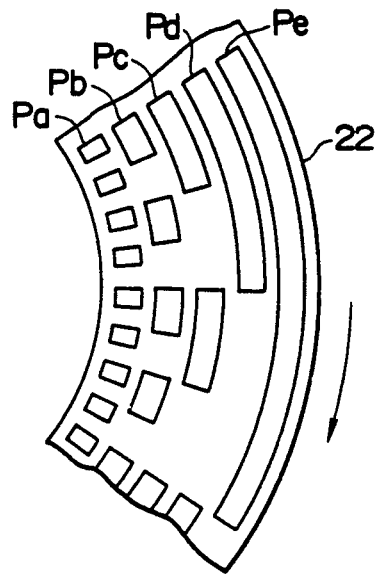
Figure 4A:
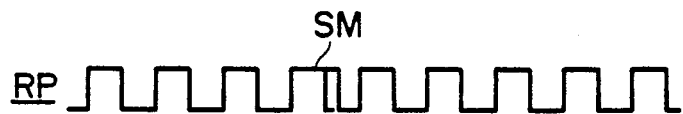
FIGS. 4A and 4B are waveform charts of reference pulses obtained from the above arrangement.

FIGS. 3A and 3B are views showing examples of encoding patterns preformatted in the above described encoding pattern area 22. FIG. 3A shows a case of the encoding pattern formed of pits P (of a circular form, an oval form, or the like) disposed at a predetermined pitch in the circular direction. One of the pits P is formed to be larger in size than others and this pit is used as a start mark SM. In the present example, the length (the length in the radial direction) of the pit P is set to be about 200 μm. When the encoding pattern is read, a reference pulse RP as shown in FIG. 4A is obtained.

Figure 4B:
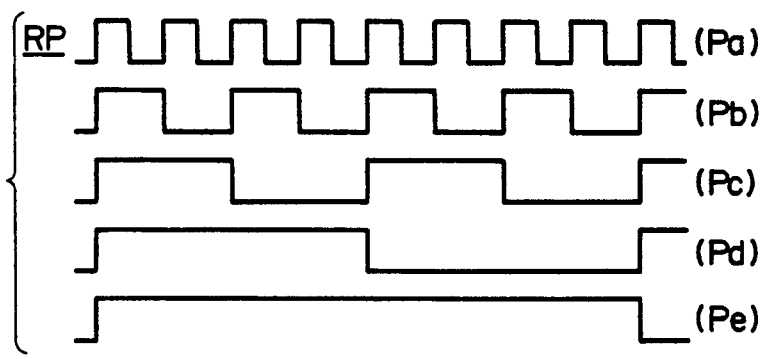

FIG. 3B shows another example of encoding pattern, which is formed of five tracks Pa-Pe having different repeated patterns. When the outermost circular track Pa is taken as a reference pattern, the pattern pitches are arranged such that, in each of the inwardly adjoining two tracks Pd-Pa, the frequency of the inner track is twice as large as that of the outer track. From such a group of patterns, reference pulses RP as shown in FIG. 4B can be obtained.

Figure 5:
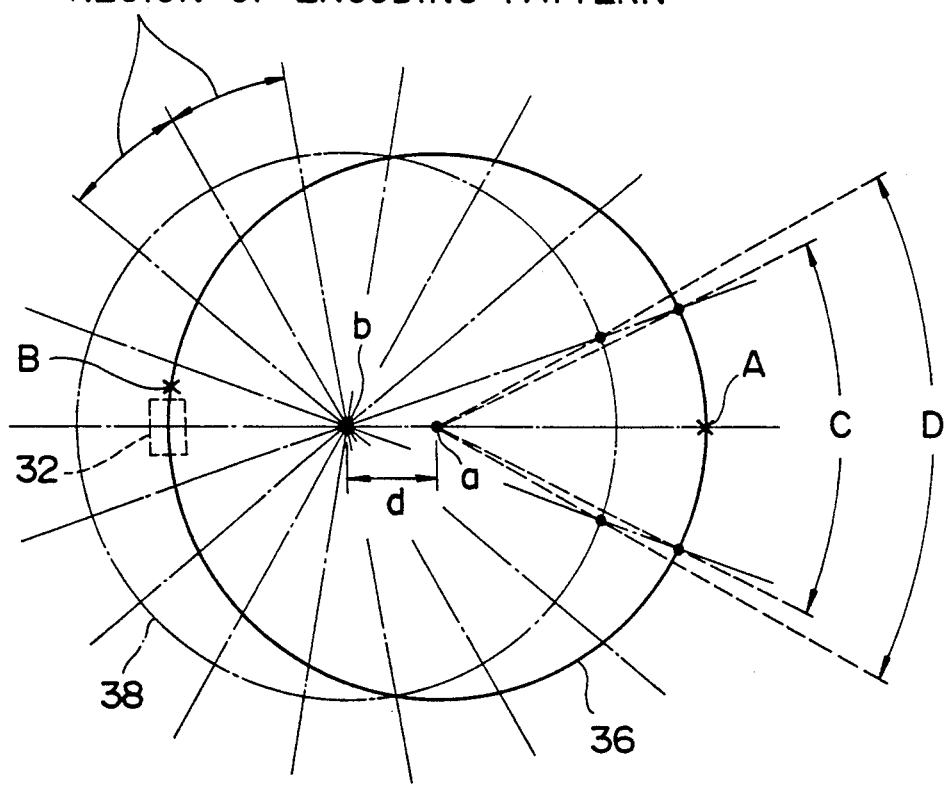
FIG. 5 is an explanatory drawing of a disk chucked with an eccentricity.

Now, we consider a case where the disk 10 arranged as described above is mounted on a recording and reproducing apparatus and used actually. As shown in FIG. 5, when the point a is assumed to be the center of rotation of the disk driving shaft, the reading means 32 is fixed at a point located a predetermined radius apart from the center of rotation a. Then, the reading means 32 traces a locus of a concentric circle 36.

When the position where the disk 10 is actually chucked is indicated by b, the position b is a distance d apart from the regular position. As the result of the chucking, the concentric circle 38 of the encoding pattern formed on the disk 10 comes to the position indicated by the one-dot chain line. When the encoding pattern of the type of a single pattern as shown in FIG. 3A is used, the regions of the encoding pattern provided by the actual chucking take on radial forms having the point b in the center.

Since the locus scanned by the reading means 32 is the concentric circle 36, the pitch of the encoding pattern on the side (A) becomes longer than the standard pitch, while the pitch of the encoding pattern on the side (B) conversely becomes shorter than the standard pitch. Thus, the cycle of the encoding pattern detected by the reading means 32 is not always constant along the circular direction but the cycle is subject to the amount of eccentricity. As a result, the frequency of the reference pulse RP obtained by converting the encoding pattern to an electric signal shows its minimum value at the point (A) and its maximum value at the point (B).

When the disk 10 is so controlled that it has a constant angular velocity CAV, the relative velocity of the sector 16 varies even if they are preformatted at a constant pitch. Accordingly, when a constant write clock WCK is used for writing data, it occurs that the data cannot wholly be written in the sector on the side (B) because of its higher relative speed.

Accordingly, in the present embodiment, the frequency of the write clock WCK is modulated on the basis of the eccentricity information obtained from the reference pulse RP. More specifically, the frequency of the write clock WCK is decreased on the side (A) and increased, conversely, on the side (B). By so doing, even if the disk 10 is chucked with a certain eccentricity, the eccentricity is absorbed and data can be properly written in the sectors 16. Also, the data can be properly read out from the sectors 16.

Figure 6:
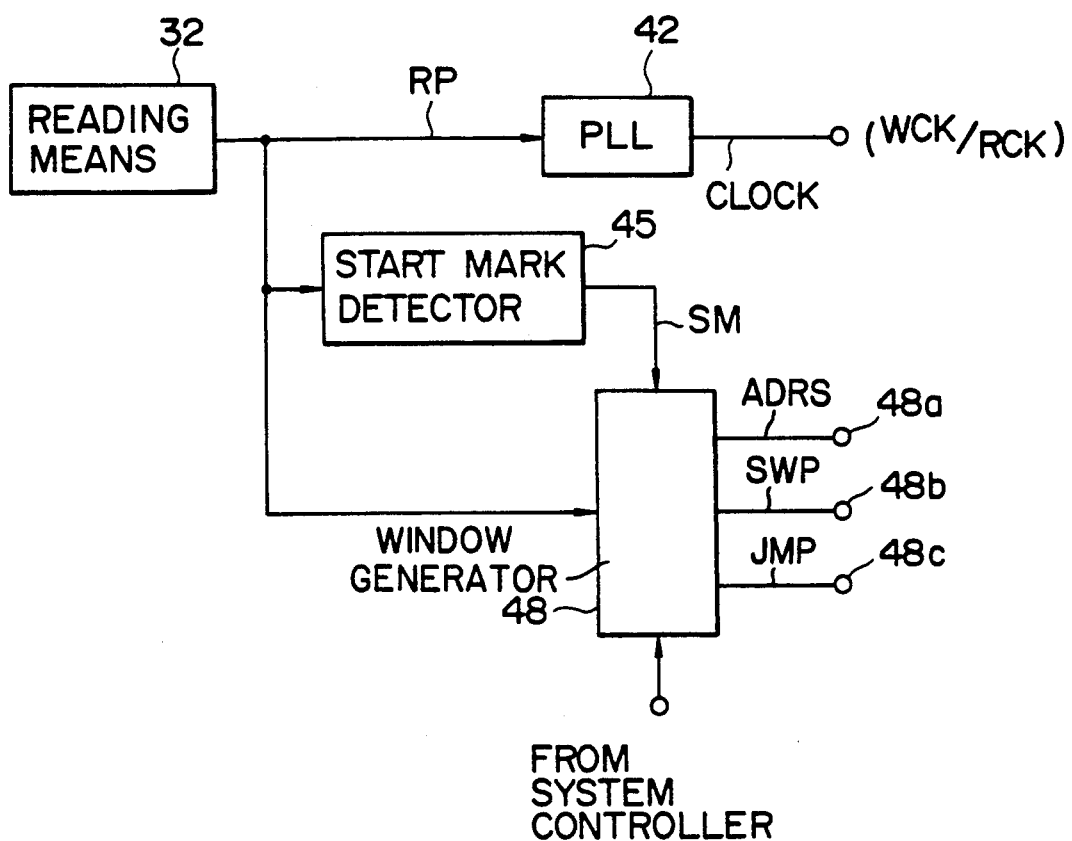
FIG. 6 is a system diagram of a clock circuit usable in the present invention.

To achieve that, a clock control circuit 40 as shown in FIG. 6 is used. The reference pulse RP read by the reading means 32 is supplied to a PLL 42, wherefrom a reference clock (write clock WCK or read clock RCK) whose frequency is modulated as described above is output as shown in FIG. 7.

Figure 7:
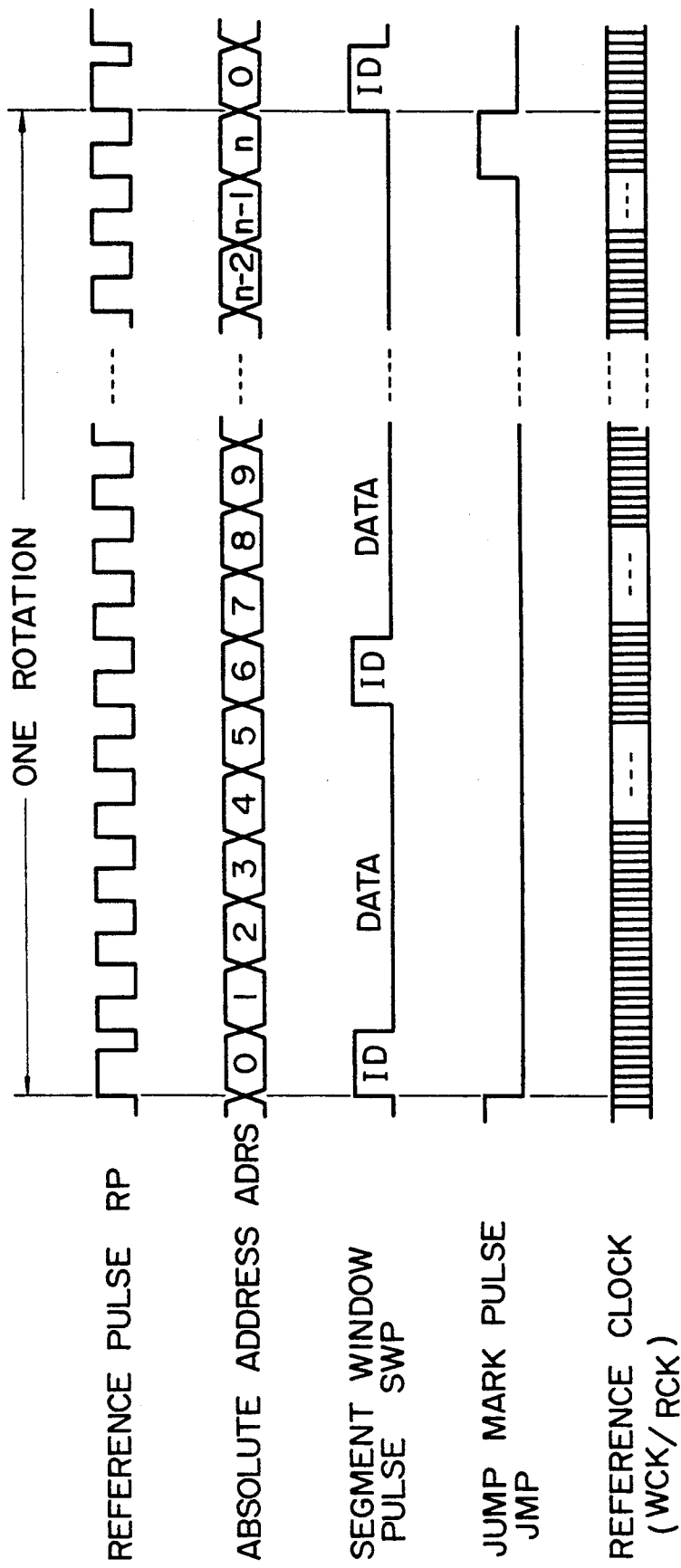
FIG. 7 is a waveform chart explanatory of the operations in the above circuit.

The reference pulse RP is also supplied to a detector circuit 45 of the start mark SM and therein the starting point of the disk 10 is detected. This start mark signal SM is further supplied to a generator circuit 48 generating various window signals. Structural information read by the reading means 32 is also supplied to the window signal generator circuit 48. The generator circuit 48, controlled by a system controller, provides such control signals for reading/writing as an absolute address ADRS from its terminal 48a and a segment window pulse SWP from its terminal 48b, and further, in the present example, provides a jump mark pulse JMP, which is to be used as a trigger point for jumping from one track position to another, from its terminal 48c, as shown in FIG. 7. The area sandwiched between the segment window pulses SWP as ID is the data area used as the sector for the video signal and audio signal.

Figure 8:
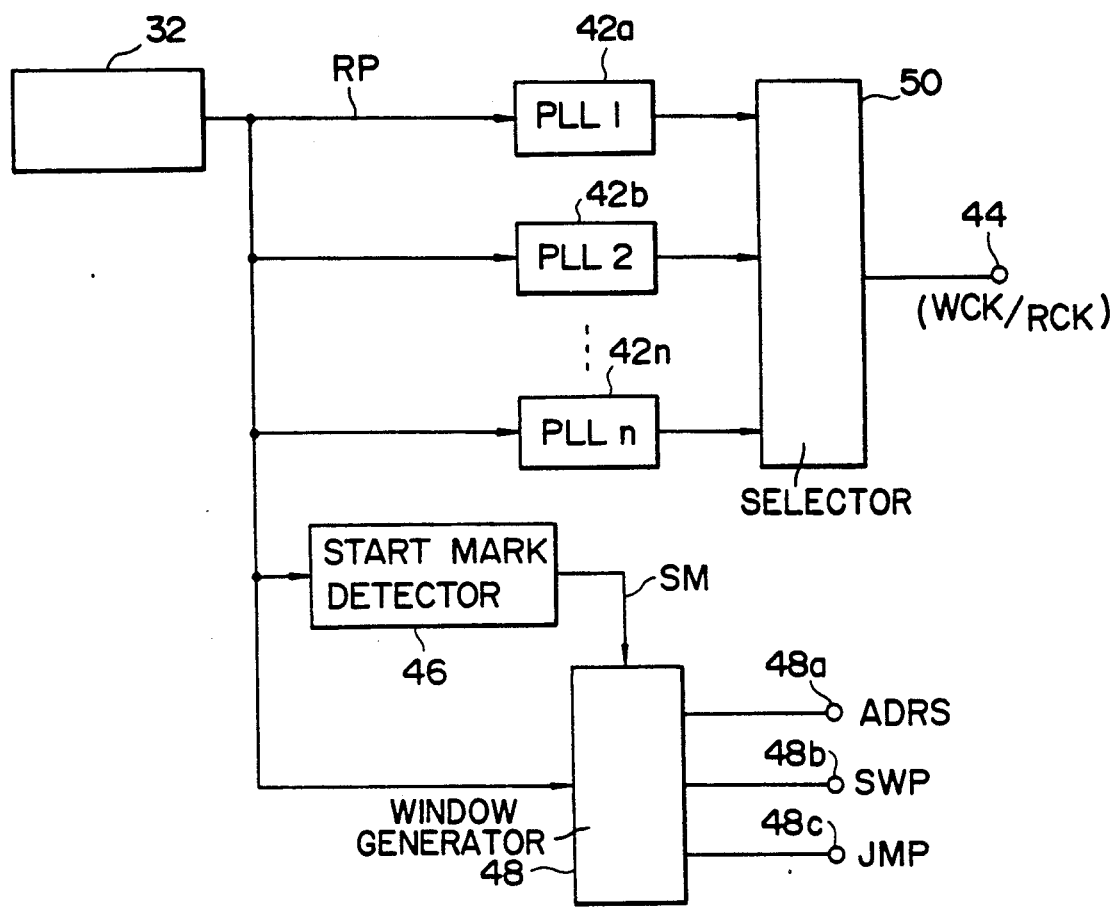
FIG. 8 is a system diagram showing another example of the clock control circuit.

FIG. 8 shows an example of a clock control circuit 40 to be applied to a disk apparatus on a multiple constant angular velocity (MCAV) control system. Since the time required for synchronous pulling in of the PLL becomes a problem when the angular velocity CAV is arranged to be variable, a plurality of dedicated PLLs 42a–42n are used to shorten the synchronous pulling in time. The reference clock delivered from the PLL matched with the selected angular velocity CAV is picked out by a selector 50. Since other arrangements are the same as those in FIG. 6, description thereof will be omitted.

Since, in data writing, the frequency of the write clock is modulated by the information of eccentricity as described above, it becomes possible to write data properly in the sectors even when the relative velocity to the sectors is not constant. Also, since, in data reading, the frequency of the read clock generated according to the clock signal recorded on the disk is modulated by the eccentricity information, data written in the sectors 16 can be properly read out. Therefore, in the present invention, writing data into desired sectors and reading data from the sectors can be achieved by providing the edit gap 18 of a length corresponding to only several clocks.

When chucking is made with a certain eccentricity as shown in FIG. 5, the relative velocity of the encoding pattern becomes slowest at the point (A) and fastest at the point (B). As to the rate of change (shift frequency/center frequency), the angle (D) corresponding to the shift frequency becomes somewhat larger than the angle (C) corresponding to the center frequency, but no problem arises therefrom because the eccentricity d is sufficiently smaller than the radius r to the read track (for example d=50 μm while r=100 mm).

Figure 9:
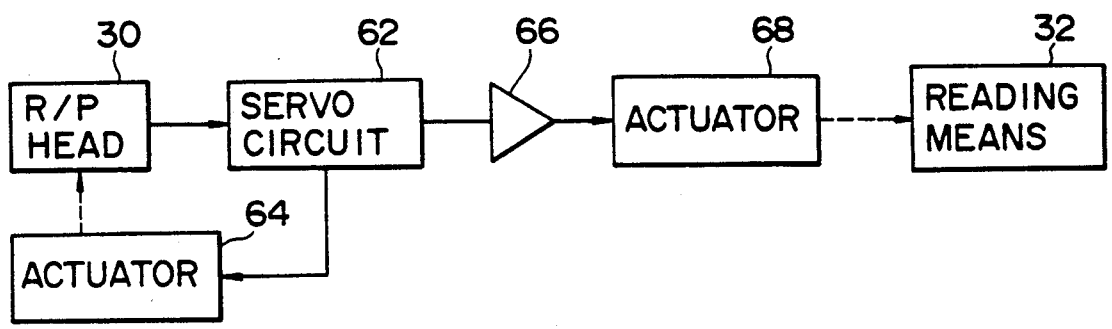
FIG. 9 is a system diagram showing an example of tracking control circuit.
Figure 10:
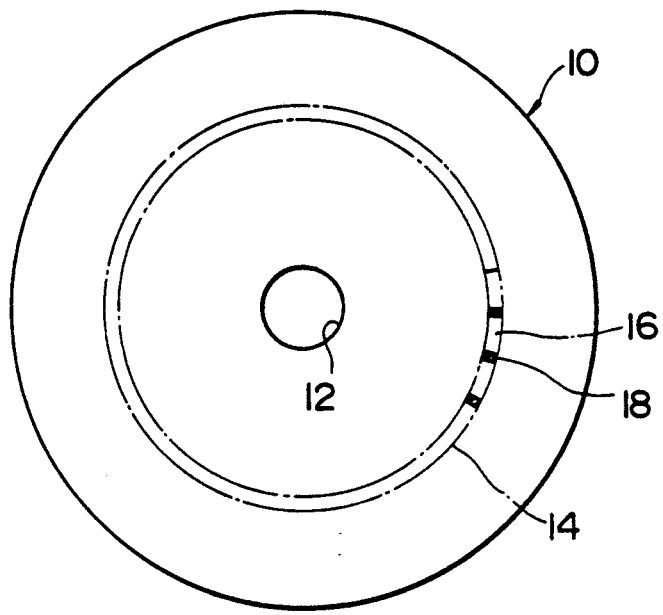
FIG. 10 is a plan view of a conventional disk.
Figure 11:
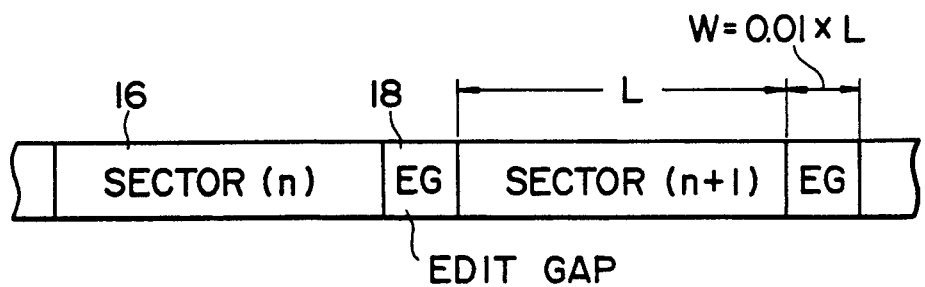
FIG. 11 is an explanatory drawing of a portion of the concentric circular track in the above.

When the rate of change poses a problem, it will be solved by arranging a tracking control circuit 60 as shown in FIG. 9. Referring to FIG. 9, the output of the recording/reproducing head 30 is supplied to a servo circuit 62 and an actuator 64 is driven by the servo output, whereby the recording and reproducing head 30 is controlled for tracking. The servo output is further supplied to an actuator 68 through an amplifier 66, whereby the reading position of the reading means 32 is finely controlled in accordance with the eccentricity d calculated from the amount of movement of the tracking actuator 64. For example, by controlling the reading position of the reading means 32 according to the rotating period of the disk 10, the above problem can be solved.

The area 22 in which the encoding pattern is formed can be provided not only on the inner side of the disk 10 but also on the outer, circumferential portion of the disk 10.

The present invention can also be applied to a disk of a laminated type, while it is quite possible that the centers of rotation of the front and rear surfaces of the disk formed by lamination do not coincide with each other. By utilizing eccentricity information as in the present invention, the frequencies of the clocks provided for both the front and the rear surfaces can be independently controlled by the eccentricity information of both the surfaces, and therefore simultaneous reproduction of both the surfaces becomes possible.

The present invention, as described in the foregoing, is a rewritable disk provided thereon with an area for forming therein a preformatted encoding pattern in order to obtain information of eccentricity produced at the time of disk chucking.

The information of the eccentricity produced at the time of disk chucking is detected, while the disk is being driven, from a reference pulse obtained by reproduction of the encoding pattern. The frequency of the writing or reading clock of data is modulated according to the eccentric positions obtained on the basis of the information of eccentricity.

According to the above described arrangement, the write clock or read clock is modulated on the basis of the eccentricity information. Hence, even when relative speeds to sectors are different, data can be correctly written in the sectors or data can be correctly read out from the sectors. Thus, the present invention is characterized in that writing data onto desired sectors or reading data from the sectors can be achieved only by providing the edit gap of a length corresponding to several clocks. Therefore, the present invention can reduce the ratio between the area of the edit gaps and the area of the entire disk and thereby greatly contribute to achievement of higher-density recording.

What is claimed is:

1. A disk shaped signal recording medium comprising:
 a center portion for engagement with a driving shaft of a rotary driving mechanism,
 an annular area for recording information data in a plurality of sectors in tracks provided thereon in the form of either concentric circles with respect to the center portion or in a spiral track provided thereon about the center portion, and
 an encoding pattern provided on said signal recording medium in an area of a concentric circle with respect to said center portion and separate from the annular area for permitting a state of eccentric engagement of said center portion with the driving shaft of said rotary driving mechanism to be detected.

2. A signal recording medium according to claim 1, wherein said encoding pattern is formed of a group of unit encoding patterns arranged in a circular direction with respect to the disk shaped recording medium at a predetermined pitch.

3. A signal recording medium according to claim 2, wherein said group of unit encoding patterns include a pattern for indicating a starting point of said encoding pattern.

4. A signal recording medium according to claim 2, wherein said unit encoding patterns are formed of plural types of encoding patterns and arranged also in a radial direction of said signal recording medium and a starting point of said encoding pattern is indicated by a combination of such plural types of unit encoding patterns.

5. A signal recording medium according to claim 2, wherein said encoding pattern is formed of an optically recorded set of pits.

6. A signal recording medium according to claim 2, wherein said encoding pattern is formed of a magnetically recorded magnetized pattern.

7. A signal recording medium according to claim 1, wherein said encoding pattern is formed at an inner circular portion of the annular area.

8. A signal recording medium according to claim 1, wherein said encoding pattern is formed at an outer circular portion of the annular area.

9. A signal recording medium according to claim 1, further comprising an area, in which additional information indicating a data structure in the track, is provided separate from both the annular area and the area in which said encoding pattern is written.

10. A signal recording apparatus having information data write means for rotating a signal recording medium with a center portion of said signal recording medium engaged with a driving shaft of a rotary driving mechanism and writing information data in a plurality of sectors in either tracks provided on said signal recording medium in the form of concentric circles with respect to the center portion or in a spiral track provided thereon, wherein the improvement comprises:

reading means for reading an encoding pattern previously provided on said signal recording medium in an area of a concentric circle with respect to said center portion and separate from the sectors and further, reading additional information, which indicates a data structure in the track, previously written on said signal recording medium in an area of a concentric circle with respect to said center portion separate from the sectors and the area in which said encoding pattern is written;

means responsive to said encoding pattern which is read, for generating a reference pulse signal including a starting point signal indicating a starting point of said encoding pattern modulating means for modulating, on the basis of said reference pulse, the frequency of a write clock signal generated in said information data write means for writing said information data onto said signal recording medium;

starting point detecting means for detecting said starting point signal from said reference pulse signal; and control signal generating means for generating, on the basis of the starting point signal output from said starting point detecting means and the additional information read by said reading means, a control signal for writing said information data with a write head along the track of said signal recording medium; wherein said information data are written in positions with said encoding pattern taken as a reference using said modulated write clock signal.

11. A signal recording apparatus according to claim 10, wherein said modulating means for modulating the frequency of said write clock signal is a phase locked loop (PLL) and the clock signal output from said PLL is synchronized in phase with said reference pulse signal.

12. A signal recording apparatus according to claim 11, wherein a plurality of PLLs are provided according to the frequency range of said write clock signal required for writing said information data in different track positions of said signal recording medium and an appropriate PLL is selected out of them depending on the track position in which said information data are written.

13. A signal recording apparatus according to claim 10, wherein said write head is controlled for tracking by a first actuator and a reading position of said reading means is moved by a second actuator according to the control made by said first actuator.

14. A signal reproducing apparatus having read-out means for reading out information data written in a plurality of sectors in either tracks provided on a signal recording medium in the form of concentric circles with respect to a center portion or in a spiral track provided thereon while said signal recording medium is rotated with the center portion thereof engaged with a driving shaft of a rotary driving mechanism and, further, having read clock signal generating means for reproducing a recorded clock signal corresponding to said information data to thereby generate a read clock for reading out said information data, wherein the improvement comprises:

reading means for reading an encoding pattern previously provided on said signal recording medium in an area of a concentric circle with respect to said center portion separate from the sectors and further, reading additional information, which indicates a data structure in the track, previously written on said signal recording medium in an area of a concentric circle with respect to said center portion separate from the sectors and the area in which said encoding pattern is written;

means responsive to said encoding pattern which is read, for generating a reference pulse signal including a starting point signal indicating a starting point of said encoding pattern;

modulating means for modulating, in accordance with said reference pulse, the frequency of said read clock signal generated in said read clock signal generating means;

starting point detecting means for detecting said starting point signal from said reference pulse signal and outputting a starting point signal; and control signal generating means for generating, on the basis of the starting point signal output from said starting point detecting means and the additional information read by said reading means, a control signal for reading out said information data with a read head from a track of said signal recording medium; wherein said information data are read out from the track using said modulated read clock signal.

15. A signal reproducing apparatus according to claim 14, wherein said modulating means for modulating the frequency of said read clock is a phase locked loop (PLL) and the clock signal output from said PLL is synchronized in phase with said reference pulse signal.

16. A signal reproducing apparatus according to claim 15, wherein a plurality of PLLs are provided according to the frequency range of said read clock signal required for reading out said information data from different track positions of said signal recording medium and an appropriate PLL is selected out of them depending on the track position from which said information data are read out.

17. A signal recording apparatus according to claim 14, wherein said read head is controlled for tracking by a first actuator and a reading position of said reading means is moved by a second actuator according to the control made by said first actuator.

* * * * *